US009317827B2

(12) United States Patent
Watanabe

(10) Patent No.: US 9,317,827 B2
(45) Date of Patent: Apr. 19, 2016

(54) FARM WORK MANAGEMENT SYSTEM, FARM WORK MANAGEMENT APPARATUS, AND FARMING MANAGEMENT METHOD

(75) Inventor: Katsuyoshi Watanabe, Fukuoka (JP)

(73) Assignee: FUJITSU LIMITED, Kawasaki (JP)

(*) Notice: Subject to any disclaimer, the term of this patent is extended or adjusted under 35 U.S.C. 154(b) by 603 days.

(21) Appl. No.: 12/563,744

(22) Filed: Sep. 21, 2009

(65) Prior Publication Data
US 2010/0010854 A1    Jan. 14, 2010

Related U.S. Application Data

(63) Continuation of application No. PCT/JP2007/057126, filed on Mar. 30, 2007.

(51) Int. Cl.
| G06Q 10/00 | (2012.01) |
| G06Q 10/06 | (2012.01) |
| G06Q 50/02 | (2012.01) |

(52) U.S. Cl.
CPC .. *G06Q 10/06315* (2013.01); *G06Q 10/063114* (2013.01); *G06Q 50/02* (2013.01)

(58) Field of Classification Search
CPC .......... G06Q 10/00; G06Q 40/00; G06F 17/60
USPC ................................... 705/7.24, 7.25
See application file for complete search history.

(56) References Cited

U.S. PATENT DOCUMENTS

| 6,058,351 A * | 5/2000 | McCauley ............... G06N 3/02 |
| | | 702/5 |
| 6,990,459 B2 * | 1/2006 | Schneider .............. A01B 79/00 |
| | | 705/7.28 |

(Continued)

FOREIGN PATENT DOCUMENTS

| CN | 1543784 A | 11/2004 |
| JP | A 6-30657 | 2/1994 |

(Continued)

OTHER PUBLICATIONS

Japanese office action issued in corresponding Japanese App. No. 2012-213165 dated Nov. 18, 2014 (with partial translation).

(Continued)

*Primary Examiner* — Romain Jeanty
(74) *Attorney, Agent, or Firm* — Greer Burns & Crain Ltd.

(57) ABSTRACT

A farm work management system includes a communication apparatus for transmitting location information of a worker carrying out a farm work and a farm work management apparatus for managing a progress of the farm work based on the location information transmitted from the communication apparatus. The communication apparatus includes a notifying unit for notifying the farm work management apparatus to the effect that the farm work is started or the farm work is finished in a case where an operation unit receives the predetermined operation. The farm work management apparatus includes a work location identifying unit for identifying the work location based on the location information transmitted from the communication apparatus, a calculating unit for calculating an estimated work time from read information, and a transmitting unit for transmitting to the communication apparatus the information about the read work content and the estimated work time having been calculated.

17 Claims, 15 Drawing Sheets

(56) References Cited

U.S. PATENT DOCUMENTS

| | | | |
|---|---|---|---|
| 7,058,508 B2 * | 6/2006 | Combs et al. | 701/484 |
| 2002/0023052 A1 * | 2/2002 | Remley | G06Q 10/087 705/38 |
| 2003/0036852 A1 * | 2/2003 | Ell | A01B 79/005 702/5 |
| 2003/0046143 A1 * | 3/2003 | Nakagawa et al. | 705/11 |
| 2005/0240561 A1 * | 10/2005 | Jain et al. | 707/1 |

FOREIGN PATENT DOCUMENTS

| | | |
|---|---|---|
| JP | A 6-133645 | 5/1994 |
| JP | A 2001-344285 | 12/2001 |
| JP | 2003-064873 | 3/2003 |
| JP | A 2003-296522 | 10/2003 |
| JP | A 2004-103023 | 4/2004 |
| JP | 2004-295808 | 10/2004 |
| JP | A 2005-92595 | 4/2005 |
| JP | 2005-130800 | 5/2005 |
| JP | A 2005-124538 | 5/2005 |
| JP | 2006-101804 | 4/2006 |
| JP | 2006-146657 | 6/2006 |
| JP | A 2006-243778 | 9/2006 |
| JP | 2006-302185 | 11/2006 |
| JP | A 2006-321277 | 11/2006 |

OTHER PUBLICATIONS

Chinese office action issued by the Chinese Patent Office in corresponding Chinese patent application No. 201210473416.6, mailed Apr. 21, 2015 (with translation).

* cited by examiner

FIG. 3

CROP MANAGEMENT TABLE 281

| CROP NAME | BREED NAME | THE NUMBER OF PLANTED CROPS | SIZE OF CULTIVATED AREA | THE NUMBER OF LANES | CULTIVATION METHOD |
|---|---|---|---|---|---|
| TOMATO | TM01 | 500 | 10 a | 10 | HOT HOUSE |
| TOMATO | TM02 | 500 | 10 a | 10 | HOT HOUSE |
| STRAWBERRY | ST01 | 2000 | 10 a | 10 | HOT HOUSE |
| STRAWBERRY | ST02 | 2000 | 10 a | 10 | HOT HOUSE |

| CULTIVATE TYPE | SEEDING DATE | PLANTING DATE | BLOOMING DATE | HARVEST DATE |
|---|---|---|---|---|
| AUTUMN CROPPING | 8/15 | 9/1 | 9/20 | 10/10 |
| SPRING CROPPING | 1/15 | 2/1 | 2/20 | 3/10 |
| PRECOCITY | — | 9/20 | 11/1 | 12/1 |
| PRECOCITY | — | 10/1 | 11/5 | 12/15 |

FIG. 4

WORK MANAGEMENT TABLE 282

| CROP NAME | WORK NUMBER | WORK NAME | STANDARD WORKING TIME | GROWTH STAGE |
|---|---|---|---|---|
| TOMATO | 1 | DISINFECTION OF FACILITY | 10H /PERSON | PREPARATION |
| TOMATO | 2 | SEEDING | 25H /PERSON | RAISING PLANTING PERIOD |
| TOMATO | 3 | RAISING PLANTING | 15H /PERSON | RAISING PLANTING PERIOD |
| TOMATO | 4 | PLANTING | 15H /PERSON | GROWTH PERIOD |
| TOMATO | 5 | FERTILIZER APPLICATION | 5H /PERSON | GROWTH PERIOD |
| TOMATO | 6 | DISBUDDING | 150H /PERSON | GROWTH PERIOD |
| TOMATO | 7 | GUIDING | 80H /PERSON | GROWTH PERIOD |
| TOMATO | 8 | THINNING | 50H /PERSON | GROWTH PERIOD |
| TOMATO | 9 | LEAF PICKING | 50H /PERSON | GROWTH PERIOD |
| TOMATO | 10 | TOP PRUNING | 50H /PERSON | GROWTH PERIOD |
| TOMATO | 11 | WATERING | 100H /PERSON | GROWTH PERIOD |
| TOMATO | 12 | SPRAYING MEDICINE | 25H /PERSON | GROWTH PERIOD |
| TOMATO | 13 | HARVEST | 500H /PERSON | HARVEST PERIOD |
| TOMATO | 14 | CLEANUP OPERATION | 30H /PERSON | PREPARATION |

FIG. 5

PROGRESS MANAGEMENT TABLE 283

| CROP NAME | LANE NUMBER | GROWTH STAGE | WORK CONTENT OF THE DAY | PROGRESS |
|---|---|---|---|---|
| TOMATO | 1 | HARVEST PERIOD | HARVEST | 30% |
| TOMATO | 2 | HARVEST PERIOD | HARVEST | 20% |
| TOMATO | 3 | HARVEST PERIOD | HARVEST | 10% |
| TOMATO | 4 | HARVEST PERIOD | HARVEST | 0% |
| TOMATO | 5 | GROWTH PERIOD | FERTILIZER APPLICATION | 50% |
| TOMATO | 6 | GROWTH PERIOD | DISBUDDING | 50% |
| TOMATO | 7 | GROWTH PERIOD | GUIDING | 30% |
| TOMATO | 8 | GROWTH PERIOD | THINNING | 90% |

FIG. 6A

WORKER MANAGEMENT TABLE 284

| No. | WORKER NAME | SEX | AGE | YEARS OF EXPERIENCE | WORKING DAYS | WORKING HOURS |
|---|---|---|---|---|---|---|
| 1001 | ○○TARO | MAN | 50 | 25 YEARS | 20 DAYS | 8:00~17:00 |
| 1002 | ○○HANAKO | WOMAN | 48 | 25 YEARS | 20 DAYS | 8:00~17:00 |
| 1003 | ○○JIRO | MAN | 25 | 5 YEARS | 20 DAYS | 8:00~17:00 |
| 1004 | ○○SABURO | MAN | 23 | 4 YEARS | 20 DAYS | 13:00~18:00 |
| 1005 | ○○SHIRO | MAN | 20 | 2 YEARS | 20 DAYS | 13:00~18:00 |

FIG. 6B

RFID MANAGEMENT TABLE 285

| RFID NUMBER | WORKER NAME | WORK START FLAG | WORK SWITCH FLAG | WORK INTERRUPTION FLAG |
|---|---|---|---|---|
| RF01 | ○○TARO | 1 | 1 | 0 |
| RF02 | ○○HANAKO | 1 | 2 | 0 |
| RF03 | ○○JIRO | 1 | 1 | 1 |
| RF04 | ○○SABURO | 0 | 0 | 0 |
| RF05 | ○○SHIRO | 0 | 0 | 0 |

FIG. 7

WORK HISTORY MANAGEMENT TABLE 286

| No. | WORKER NAME |
|---|---|
| 1001 | ○○ TARO |

| WORKING DATE | WORKING CONTENT | WORK START TIME | WORK END TIME | INTERRUPTION START TIME | INTERRUPTION END TIME | REASON OF INTERRUPTION |
|---|---|---|---|---|---|---|
| 07/1/20 | FERTILIZER APPLICATION | 8:00 | 10:00 | - | - | - |
| 07/1/20 | DISBUDDING | 10:00 | 17:00 | 13:00 | 15:00 | SPRAYING MEDICINE FOR PEST CONTROL |
| 07/1/21 | DISBUDDING | 8:00 | 17:00 | - | - | - |

FIG. 8A  PEST MANAGEMENT TABLE 287

| No. | CROP NAME | BREED NAME | LANE | GROWTH STAGE | DISCOVERY DATE | LOCATION | PEST NAME | IMAGE | WEATHER CONDITION ||| 
|||||||||| TEMPERATURE | HUMIDITY | SUNLIGHT |
| 1 | TOMATO | TM01 | 1 | HARVEST PERIOD | 07/1/20 10:00 | 10m FROM ENTRANCE | APHID | EXIST | 22C | 60% | 5 H |
| 2 | TOMATO | TM02 | 5 | HARVEST PERIOD | 07/1/20 10:00 | 10m FROM ENTRANCE | APHID | NOT EXIST | 24C | 60% | 5 H |
| 3 | STRAWBERRY | ST01 | 2 | HARVEST PERIOD | 07/1/20 13:00 | CENTER A POINT | MILDEW | EXIST | 18C | 70% | 5 H |
| 4 | STRAWBERRY | ST01 | 2 | HARVEST PERIOD | 07/1/20 13:00 | 5m FROM ENTRANCE | GRAY MOLD | EXIST | 18C | 70% | 5 H |

FIG. 8B  PEST MEASURE HISTORY TABLE 288

| No. | DISCOVERY DATE | LOCATION | PEST NAME | MEASURE DATE | SPRAYING MEDICINE | CONCENTRATION | NUMBER OF TIMES | RANGE OF SPRAYING |
|---|---|---|---|---|---|---|---|---|
| 1 | 07/1/20 10:00 | 10m FROM ENTRANCE | APHID | 07/1/20 17:00 | DDVP EMULSION | 1000TIMES | 1 | 1 BLOCK |
| 2 | 07/1/20 10:00 | 10m FROM ENTRANCE | APHID | 07/1/20 17:00 | DDVP EMULSION | 1000TIMES | 2 | 1 BLOCK |
| 3 | 07/1/20 13:00 | CENTER A POINT | MILDEW | 07/1/20 17:00 | EUPAREN... | 2000TIMES | 1 | 4 LANE |
| 4 | 07/1/20 13:00 | 5m FROM ENTRANCE | GRAY MOLD | 07/1/20 17:00 | RONILAN... | 2000TIMES | 1 | 4 LANE |

FIG. 9

MEDICINE DATABASE 280

| REGISTRATION NUMBER | TYPE | NAME | GENERIC NAME | CONCEN-TRATION | NUMBER OF MIXING | USE | FORMULA-TION TYPE | THE NUMBER OF LIMITATION | AVAILABILITY |
|---|---|---|---|---|---|---|---|---|---|
| 2100 | MARATHON EMULSION | ○○ EMULSION50 | MARATHON | 50% | 1 | APHICIDE | EMULSION | 0 | ○ |
| 2283 | MARATHON EMULSION | △△ EMULSION | MARATHON | 50% | 1 | APHICIDE | EMULSION | 0 | ○ |
| 2375 | MARATHON POWDER | △△ POWDER 3 | MARATHON | 3% | 1 | APHICIDE | POWDER | 0 | ○ |
| 14346 | MARATHON OIL SOLUTION | ○□OIL SOLUTION 20 | MARATHON | 20% | 1 | APHICIDE | OIL SOLUTION | 0 | ○ |
| 15463 | FENVALE ... | ×× HYDRATION | MARATHON | 30% | 2 | APHICIDE | HYDRATION | 1 | ○ |
| 15464 | FENVALE ... | ○× HYDRATION | MARATHON | 30% | 2 | APHICIDE | HYDRATION | 2 | ○ |
| 16087 | MARATHON B ... | AB POWDER DL | MARATHON | 2% | 3 | APHICIDE PESTICIDE | POWDER | 3 | ○ |
| 19559 | DIAZINE ... | X Y-A EMULSION | MARATHON | 1% | 3 | APHICIDE | EMULSION | 4 | ○ |

FIG. 12

| No. | DISCOVERY DATE | LOCATION | PEST NAME | SEARCH RESULT MEDICINE | STOCK | THE NUMBER OF SPRAYING | SPRAYING | ORDER CONDITION |
|---|---|---|---|---|---|---|---|---|
| 1 | 07/1/20 10:00 | 10m FROM ENTRANCE | APHID | DDVP EMULSION | EXIST | 3 | NOT PERMIT | – |
| | | | | ADMIRE HYDR.... | NOT EXIST | 0 | NOT PERMIT | ONLINE ORDER PROCEDURE |
| | | | | ORTOLAN HYD... | NOT EXIST | 0 | NOT PERMIT | ONLINE ORDER PROCEDURE |
| | | | | DIAZINE EMULSION | NOT EXIST | 1 | NOT PERMIT | – |

FIG. 14

| No. | CROP NAME | BREED NAME | LANE | GROWTH STAGE | DISCORVERY DATE | LOCATION | PEST NAME | COMTAMI-NATED RANGE | DEGREE OF SPREAD |
|---|---|---|---|---|---|---|---|---|---|
| 1 | TOMATO | TM01 | 1 | HARVEST PERIOD | 07/1/18 10:00 | 7~8m FROM ENTRANCE | APHID | 1m² | — |
| 2 | TOMATO | TM01 | 1 | HARVEST PERIOD | 07/1/19 10:00 | 6~10m FROM ENTRANCE | APHID | 4m² | 3m² / 1 day |
| 3 | TOMATO | TM01 | 1 | HARVEST PERIOD | 07/1/20 10:00 | 5~15m FROM ENTRANCE | APHID | 10m² | 3m² / 1 day |

FIG. 15A

| No. | CROP NAME | BREED NAME | PEST NAME | SPRAYING MEDICINE | CONCEN-TRATION | TOTAL NUMBER OF TIMES | RESISTANCE |
|---|---|---|---|---|---|---|---|
| 1 | TOMATO | TM01 | APHID | DDVP EMULSION | 1000 TIMES | 1 | EXIST |
| 2 | TOMATO | TM02 | APHID | DDVP EMULSION | 1000 TIMES | 3 | NOT EXIST |
| 3 | TOMATO | TM03 | APHID | EUPAREN HYDRATION | 2000 TIMES | 1 | EXIST |

FIG. 15B

| No. | CROP NAME | BREED NAME | PEST NAME | SPRAYING MEDICINE | CONCEN-TRATION | TOTAL NUMBER OF TIMES | RESISTANCE |
|---|---|---|---|---|---|---|---|
| 1 | TOMATO | TM01 | APHID | DDVP EMULSION | 1000 TIMES | 1 | EXIST |
| 2 | TOMATO | TM02 | SPODOPTERA FLUGIPERDA | DDVP EMULSION | 1000 TIMES | 3 | NOT EXIST |
| 3 | TOMATO | TM03 | APHID | DDVP EMULSION | 2000 TIMES | 1 | EXIST |

FARM WORK MANAGEMENT SYSTEM, FARM WORK MANAGEMENT APPARATUS, AND FARMING MANAGEMENT METHOD

CROSS-REFERENCE TO RELATED APPLICATIONS

This application is a continuation, filed under 35 U.S.C. §111(a), of PCT International Application No. PCT/JP2007/057126 which has an international filing date of Mar. 30, 2007, and designated United States of America.

FIELD

The present application relates to a farming management system, a farming management device, and a farming management method for managing the progress of farm work.

BACKGROUND

Conventionally, a cultivation system has been suggested, wherein the cultivation system can manage each plant in details by managing data such as the type of a plant, the type of an agrichemical, the application amount of the agrichemical, the type of a fertilizer, the application amount of the fertilizer, the water supply quantity, the date of planting, the expected date of harvest, and the like (for example, see Japanese Patent Laid-Open No. H06-133645).

Regarding farm work, a technique for generating a work log by obtaining a location and time information of a GPS receiver and deducing work items that should be performed by a worker from multiple work candidates that can be performed by the worker (for example, see Japanese Patent Laid-Open No. 2005-124538) and a technique capable of managing the history of farm works by automatically collecting information about farm works performed on farm products (for example, see Japanese Patent Laid-Open No. 2005-92595) are disclosed.

Further, a technique for preparing questions for the user and using the answers in reply to the questions to perform predictive diagnosis using artificial intelligence is disclosed as an apparatus for diagnosing pests (for example, see Japanese Patent Laid-Open No. H06-30657).

However, in the cultivation system described in Japanese Patent Laid-Open No. H06-133645, an operating machine is configured to manage information about carrying out works, and it is necessary to arrange a data carrier in proximity to a plant, and there is a problem in that the cultivation system cannot provide information about the work carried out by each worker.

Further, a farm work recording automation system described in Japanese Patent Laid-Open No. 2005-124538 refines work items, such as a date, weather conditions, a time period, and the like, through rule-based deduction, and therefore, the work items may be identified from a broad perspective, but there is a problem in that the result obtained through the deduction does not necessarily reflect a correct work place, a working start time, a working end time.

A farm work history management apparatus described in Japanese Patent Laid-Open No. 2005-92595 has such a configuration that one piece of work information is managed with one identifier memorized in an IC tag, and therefore, there is a problem in that it is necessary to use multiple IC tags if multiple pieces of information such as a work place, a working start time, a working end time, and the like are to be obtained, and the management of the IC tags becomes very cumbersome if there are wide range of cultivated farm products and the breed varieties and there are many work locations and workers.

The technique disclosed in Japanese Patent Laid-Open No. H06-30657 has a problem in that the user himself has to input the answer in reply to the presented question, and the predictive diagnosis is performed using artificial intelligence, and therefore, a highly accurate diagnosis result is not necessarily obtained. Furthermore, the degree of spread of the pests cannot be calculated, and therefore, the degree of urgency such as extermination measures cannot be estimated.

SUMMARY

A farm work management system according to an aspect of the present application includes: a communication apparatus for transmitting location information of a worker carrying out a farm work; and a farm work management apparatus for managing a progress of the farm work based on the location information transmitted from the communication apparatus, wherein the communication apparatus includes an operation unit for receiving a predetermined operation at a start or an end of the farm work, means for notifying the farm work management apparatus to the effect that the farm work is started or the farm work is finished in a case where the operation unit receives the predetermined operation, means for receiving information transmitted from the farm work management apparatus, and a display unit for displaying the received information; and wherein the farm work management apparatus includes a progress management table for associating and storing a work location, a work content to be carried out at the work location, and a progress of the work, means for generating a work history based on the notification from the communication apparatus, means for identifying the work location based on the location information transmitted from the communication apparatus, means for reading out information about the progress and the work content to be carried out at the identified work location from the progress management table, means for calculating an estimated work time from the read information about the progress, and means for transmitting to the communication apparatus the information about the read work content and the estimated work time having been calculated.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a conceptual diagram showing an example of a crop management table.

FIG. 4 is a conceptual diagram showing an example of a work management table.

FIG. 5 is a conceptual diagram showing an example of a progress management table.

FIGS. 6A and 6B are a conceptual diagram showing an example of a worker management table and an RFID management table.

FIG. 7 is a conceptual diagram showing an example of a work history management table.

FIGS. 8A and 8B are a conceptual diagram showing an example of a pest management table and a pest measure history table.

FIG. 9 is a conceptual diagram showing an example of a medicine database.

FIG. 12 is a table showing an example of a search result of medicines.

FIG. 14 is a table showing an example of a calculation result of the degree of spread of the pests.

FIGS. 15A and 15B are a table showing an example of an extraction result of the breed varieties resistant to the pests and drug-resistant pests resistant to the pests.

DESCRIPTION OF EMBODIMENTS

Hereinafter, the present invention will be specifically described based on the drawings showing the embodiment thereof.

Figure 1:
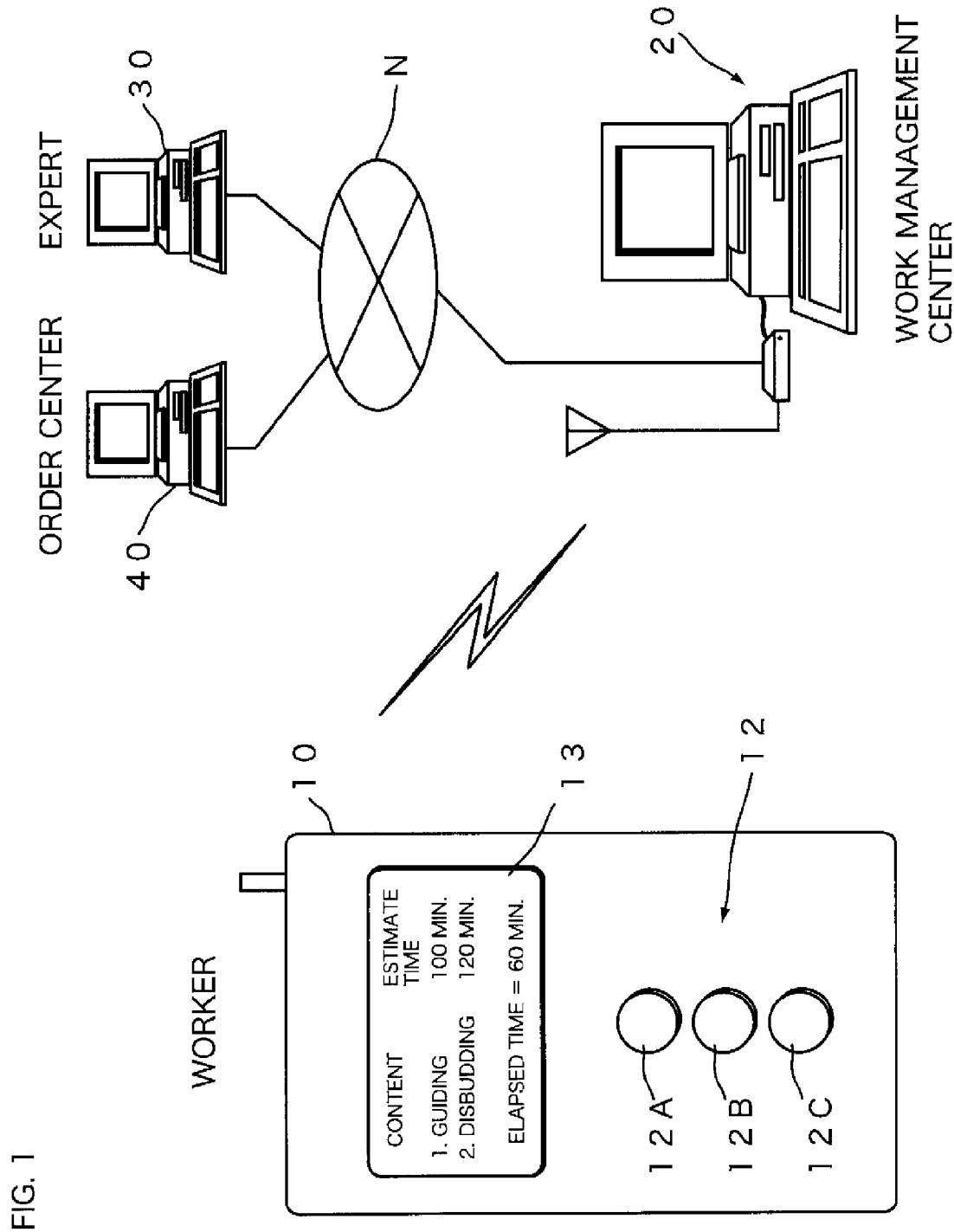
FIG. 1 is a schematic diagram showing the entire configuration of a farm work management system according to the present embodiment.

FIG. 1 is a schematic diagram showing the entire configuration of a farm work management system according to the present embodiment. The farm work management system according to the present embodiment includes a communication terminal 10 carried by each worker carrying out the farm work and a farm work management apparatus 20 installed in a work management center managing the farm work.

The communication terminal 10 is arranged with an operation unit 12 including three operation buttons 12A to 12C, which is, for example, a button-type RFID tag (RFID: Radio Frequency Identification), and a display unit 13 for displaying information transmitted from the farm work management apparatus 20. In a case where the operation buttons 12A to 12C are depressed, the communication terminal 10 is configured to transmit to the farm work management apparatus 20 a signal that differs according to each operation button 12A to 12C (for example, a signal that differs in the frequency). The communication terminal 10 transmits, to the farm work management apparatus 20, information for distinguishing the communication terminal 10 during transmission of these signals (hereinafter referred to as RFID number) and information about the location of the communication terminal 10 (hereinafter referred to as location information) at the same time as or before or after the signals.

The farm work management apparatus 20 makes a determination as to what kind of notification is given from the communication terminal 10 by distinguishing the three types of signals transmitted from the communication terminal 10. In the present embodiment, in a case where the farm work management apparatus 20 receives the signal that the communication terminal 10 transmits when the operation button 12A is depressed, the farm work management apparatus 20 determines that the worker carrying the communication terminal 10 starts or finishes the work. Similarly, in a case where the farm work management apparatus 20 receives the signal that the communication terminal 10 transmits when the operation button 12B is depressed, the farm work management apparatus 20 determines that the worker has finished the current work and switches to a subsequent work. Further, in a case where the farm work management apparatus 20 receives the signal that the communication terminal 10 transmits when the operation button 12C is depressed, the farm work management apparatus 20 determines that the work is interrupted due to some reason.

The farm work management apparatus 20 manages the farm work based on the notification from the communication terminal 10 realized by receiving such signals and the location information transmitted from the communication terminal 10. For example, the farm work management apparatus 20 receives from the communication terminal 10 a notification to the effect that the work starts (namely, the signal, which is transmitted when the operation button 12A is depressed), the farm work management apparatus 20 identifies the location where the worker carrying this communication terminal 10 is carrying out the work (hereinafter referred to as the work location), and transmits to the communication terminal 10 the estimated working time and the work content to be carried out at the identified work location. The communication terminal 10 receiving such information displays the information on the display unit 13. The example shown in FIG. 1 displays a guiding work and a disbudding work as a work schedule of the day, and shows that the estimated working times of the works are 100 minutes and 120 minutes, respectively.

In a case where the farm work management apparatus 20 receives from the communication terminal 10 a notification to the effect that the work content is switched (namely, the signal, which is transmitted when the operation button 12B is depressed), the farm work management apparatus 20 updates the work history of each worker and the progress of the work. Further, in a case where the farm work management apparatus 20 receives from the communication terminal 10 a notification to the effect that the work is interrupted (namely, the signal, which is transmitted when the operation button 12C is depressed) and where the interruption reason is the occurrence of the vermin or disease, information about the interruption reason, the discovery date of the vermin or disease (pests), the discover location, the sprayed medicine, and the like is registered to a table described below. By analyzing the content registered in the table, the farm work management apparatus 20 can calculate the degree of spread of the vermin or disease (the degree of seriousness and the degree of danger) and can extract the breed variety resistant to the pests and the drug-resistant pests.

Further, the farm work management apparatus 20 is connected via a communication network N to a terminal 30 used by an expert of the pest diagnosis and to a terminal 40 installed in an order center of medicines. Therefore, in a case where the vermin or disease is found but what measure should be take is not known, the diagnosis can be performed reliably and swiftly by transmitting to the terminal 30 used by the expert the information about the plant, the breed variety, the growth stage, the discovery date, the discovery location, the name of the pest, the image, the weather conditions, and the like. Further, in a case where the medicine to be sprayed to the vermin or disease is out of stock, the necessary medicine can be swiftly secured by placing an online order with the terminal 40 of the order center.

In the present embodiment, the farm work management apparatus 20 is configured to directly receive the signal, which is transmitted from the communication terminal 10, but it is to be understood that one or multiple repeating apparatuses may be arranged to relay signals and information transmitted between the communication terminal 10 and the farm work management apparatus 20.

Figure 2:
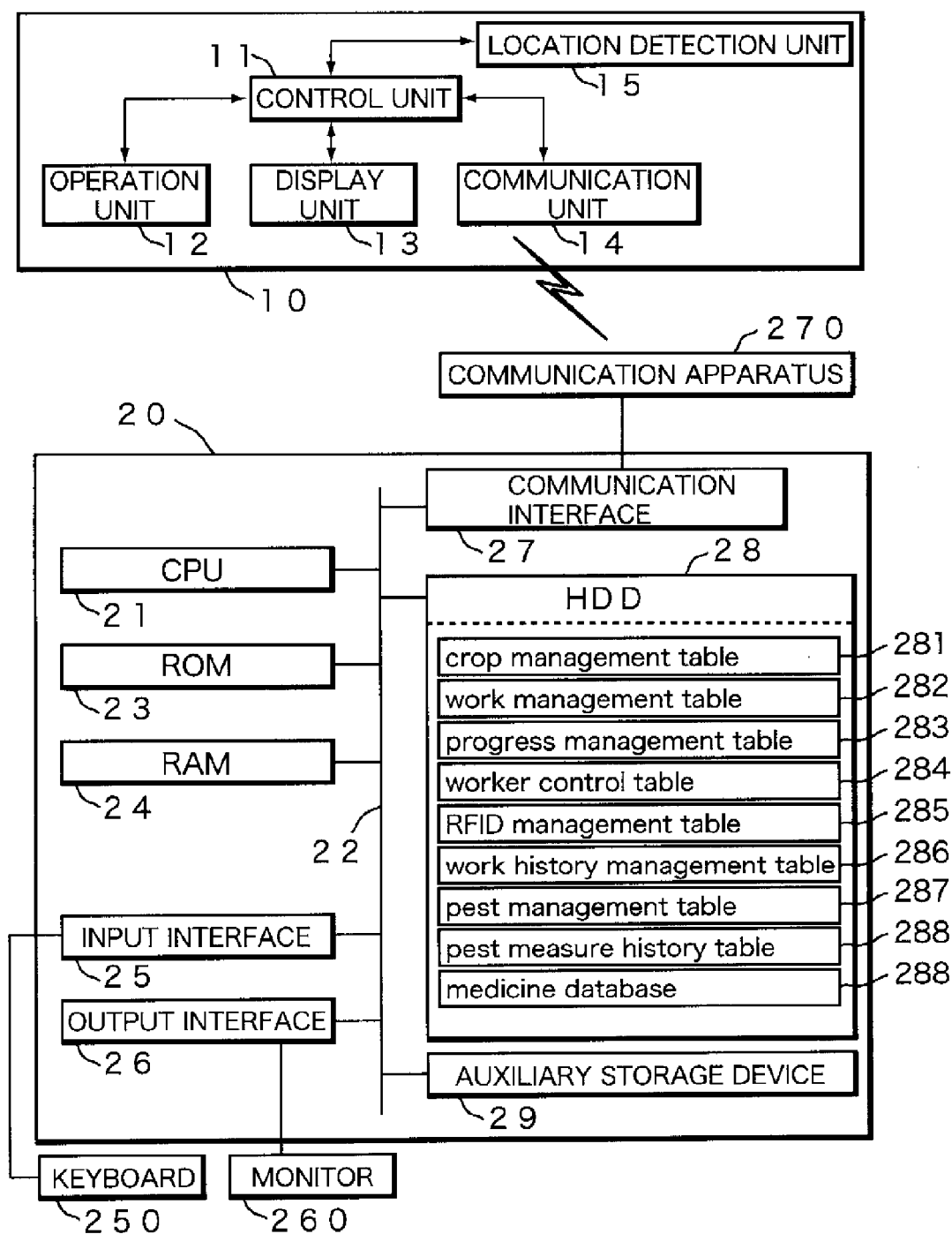
FIG. 2 is a block diagram illustrating the internal configuration of a communication terminal and a farm work management apparatus.

FIG. 2 is a block diagram illustrating the internal configuration of the communication terminal 10 and the farm work management apparatus 20. The communication terminal 10 includes a control unit 11, an operation unit 12, a display unit 13, a communication unit 14, and a location detection unit 15. The control unit 11 controls the operation of each of the hardware devices 12 to 15 to cause the entirety to function as the communication apparatus according to the present embodiment The control unit 11 is arranged with a control program for controlling the operation of each of the hardware devices 12 to 15, a ROM previously storing identification information for identifying the control unit 11 from the others, a CPU for executing the programs stored in this ROM, and the like. In a case where the operation buttons 12A to 12C of the operation unit 12 are depressed, the control unit 11 generates a signal according to each of the operation buttons 12A to 12C, and transmits the signal to the farm work management apparatus 20 via the communication unit 14. When these signals are transmitted, the identification information (RFID number) and the location information obtained by the location detection unit 15 are transmitted to the farm work management apparatus 20 at the same time as or before or after the signals.

The farm work management apparatus 20 is arranged with a CPU 21, a ROM 23, a RAM 24, an input interface 25, an output interface 26, a communication interface 27, an HDD 28, and an auxiliary storage device 29. Each of these hardware units is connected via a bus 22. The ROM 23 is previously recorded with a computer program according to the present invention, a control program for controlling each of the hardware units, and the like. The CPU 21 loads these programs to the RAM 24 and executes the programs to cause the entire apparatus to function as the farm work management apparatus 20 according to the present invention. Further, the CPU 21 has a built-in clock, and is configured to be able to output time information of the time when various processings are executed.

The communication interface 27 is connected to the communication terminal 10 carried by the worker and to a communication apparatus 270 for communicating with each of the terminals 30 and 40 connected to the network N. Communication with the communication terminal 10 and the terminals 30 and 40 can be made by controlling the operation of this communication apparatus 270. The communication apparatus 270 is arranged with, for example, an antenna circuit for receiving the signal, which is transmitted from the communication terminal 10, a signal conversion circuit for converting the signal received by the antenna circuit into a digital signal, and a forwarding engine for deciding the output destination of the information to be transmitted.

The HDD 28 is a magnetic storage apparatus, and a portion of the storage area thereof is used as a crop management table 281, a work management table 282, a progress management table 283, a worker control table 284, an RFID management table 285, a work history management table 286, a pest management table 287, a pest measure history table 288, and a medicine database 280. The content of each of the tables 281 to 288 and the medicine database 280 is updated automatically or manually as needed. It should be noted that each of these tables 281 to 288 and the medicine database 280 will be described later in detail.

The input interface 25 is connected to a keyboard 250, and receives information to be registered to the medicine database 280 and the tables 281 to 288 arranged in the HDD, an execution instruction of various processings, and the like. The output interface 26 is connected to a monitor 260, which displays the information registered to the medicine database 280 and the tables 281 to 288, execution results of various processings, and the like.

In the present embodiment, the computer programs according to the present invention are previously stored in the ROM 23 serving as a recording medium, and the CPU 21 is configured to read out and execute the computer programs, but the computer programs according to the present invention may be stored in a portable recording medium, for example, a magnetic disk such as FD, an optical disk such as CD-ROM, MO, MD, and DVD-ROM, a card-type memory such as an IC card, a memory card, and an optical card. The computer programs may be read using the auxiliary storage device 29, and the CPU 21 may execute the computer programs having been read.

In the present embodiment, the farm work management apparatus 20 is configured to include the medicine database 280, but the medicine database 280 may be arranged in a storage device directly or via an arbitrary communication network connected to the farm work management apparatus 20.

An example of various tables and medicine database 280 arranged in the HDD of the farm work management apparatus 20 will be hereinafter described. FIG. 3 is a conceptual diagram showing an example of the crop management table 281. The crop management table 281 stores information about the name of the crop, the name of the breed variety, the number of planted crops, the size of the cultivated area, the number of lanes, a cultivation method, the type of cultivation, a date of seeding, a date of fix planting, a date of blooming, and a date of harvest in association with each other.

FIG. 4 is a conceptual diagram showing an example of the work management table 282. The work management table 282 stores information about the name of a crop, a work number, the name of the work, a standard working time, and a growth stage in association with each other. In this work management table 282, the names of the works are registered in the order of execution. Therefore, for example, this work management table 282 shows that the seeding work is carried out after the facility sterilization work. Further, a working time when one worker carries out the work on the cultivated area of 10a is stored as the standard working time.

FIG. 5 is a conceptual diagram showing an example of the progress management table 283. The progress management table 283 stores information about the name of the crop, the lane number, the growth stage, the work content of the day, and the progress in association with each other. Namely, the progress management table 283 stores information about the work content and the progress in association with the work location (lane number). In the example shown in FIG. 5, a table for managing the progress of "tomato" is shown, but the progress management table 283 is registered with the progress for each plant and each breed variety of the plant.

FIGS. 6A and 6B are a conceptual diagram showing an example of the worker management table 284 and the RFID management table 285. The worker management table 284 shown in FIG. 6A stores information about the name of the worker, the sex, the age, the number of years of experience, the number of days worked, and the working hours in association with each other. The RFID management table 285 shown in FIG. 6B stores the RFID number, the name of the worker, a work start flag, a work switching flag, and a work interruption flag in association with each other. The RFID number is unique identification information assigned to each of the communication terminals 10. The work start flag is a flag showing whether or not the worker is carrying out the work. When the worker is carrying out the work, "1" is set to the work start flag. When the worker is not carrying out the work, "0" is set to the work start flag. The work switching flag is a flag showing the number of times the work is switched, and an integer value equal to the number of times of switching is set to the work switching flag. The work interruption flag is a flag showing whether or not the work carried out by the worker is interrupted. When interrupted, "1" is set to the work interruption flag. When not interrupted, "0" is set to the work interruption flag. This RFID management table 285 is configured to be automatically updated in a case where the farm work management apparatus 20 receives the signal, which is transmitted when the operation buttons 12A to 12C of the communication terminal 10 are depressed.

FIG. 7 is a conceptual diagram showing an example of the work history management table 286. The work history management table 286 stores the date of the work, the work content, a work start time, a work end time, an interruption start time, an interruption end time, and a reason of the interruption in association with each other. This work history management table 286 is a table prepared for each worker, and is configured to be automatically updated in a case where the farm work management apparatus 20 receives the signal, which is transmitted when the operation buttons 12A to 12C of the communication terminal 10 are depressed. As necessary, the keyboard 250 connected to the input interface 25 receives an input of an item of the reason of the interruption.

FIGS. 8A and 8B are a conceptual diagram showing an example of the pest management table 287 and the pest measure history table 288. The pest management table 287 shown in FIG. 8A associates and stores information about the name of the plant, the name of the breed variety the lane number, the growth stage, the discovery date, the location, the name of the pest, the presence or absence of an image, and the weather conditions (temperature, humidity, sunlight). Further, the pest measure history table 288 shown in FIG. 8B stores information about the discovery date, the location, the name of the pest, a date when a measure is taken, a sprayed medicine, a concentration, a total number of times, and the range of spraying in association with each other. These tables are updated automatically or manually as needed.

FIG. 9 is a conceptual diagram showing an example of the medicine database 280. The medicine database 280 stores a registration number of a medicine, a type, a name, a generic name, a concentration, the number of mixing, a use, a formulation type name, a limitation on the number of times of spraying, and whether the medicine can be sprayed, in association with each other.

Figure 10:
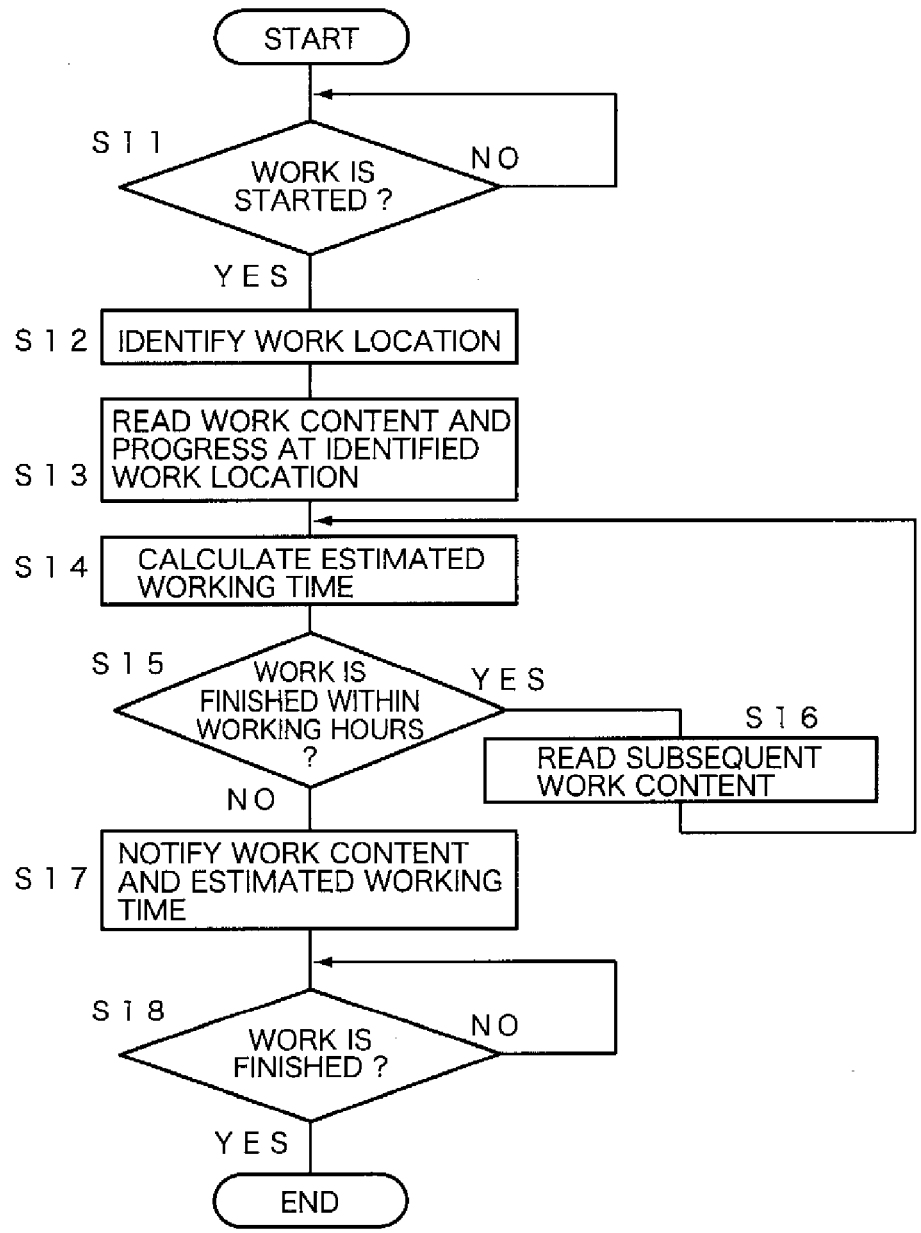
FIG. 10 is a flowchart showing a procedure of processings executed by a farm work management apparatus at the start of the work.

The processings executed by the farm work management apparatus 20 will be hereinafter described. FIG. 10 is a flowchart showing a procedure of processings executed by the farm work management apparatus 20 at the start of the work. First, the farm work management apparatus 20 makes a determination whether the work carried out by the worker has started, based on the notification from the communication terminal 10 input via the communication interface 27 (step S11). Namely, when the farm work management apparatus 20 receives the signal, which is transmitted when the operation button 12A of the communication terminal 10 is depressed, and the RFID number of the communication terminal 10 thereof via the communication apparatus 270, the farm work management apparatus 20 refers to the RFID management table 285 to check whether the work start flag corresponding to the received RFID number is "1" or "0", so that the farm work management apparatus 20 can determine whether the work is started by the worker carrying the corresponding communication terminal 10. The farm work management apparatus 20 waits until the work starts in a case where the farm work management apparatus 20 does not receive the signal, which is transmitted when the operation button 12A of the communication terminal 10 is depressed, namely, in a case where the work is determined not to have started (S11: NO).

In a case where the work start flag is "0" when the farm work management apparatus 20 receives the signal, which is transmitted when the operation button 12A of the communication terminal 10 is depressed, and the RFID number of the corresponding communication terminal 10, the operation button 12A is determined to be depressed when the work has not yet been executed, and therefore, the work is determined to have started (S11: YES). Accordingly, "1" is set to the work start flag, and the work location is identified based on the location information transmitted from the communication terminal 10 at the same time as or before of after these signals (step S12). The work location can be identified by previously preparing tables in which the location information and the work location are associated, or by previously preparing a function that outputs the work location assuming that the location information is variable, and, and by using these tables or the function.

Next, the farm work management apparatus 20 reads the work content and the progress at the identified work location from the progress management table 283 (step S13). For example, when the identified work location is a location corresponding to "lane number 1", the content read out is that the work content of the day is "harvest" and the progress is "30%."

Subsequently, the farm work management apparatus 20 calculates the estimated working time of the work content read out (step S14). The standard working time (namely, the working time when one worker carries out the work on the cultivated area of 10a) of each work is registered in the work management table 282, and the size of the cultivated area is registered in the crop management table 281, and therefore, the estimated working time can be calculated by considering such information and information about the number of people currently carrying out the work and the progress read out. At this moment, the estimated working time may be calculated upon multiplying the estimated working time by a factor reflecting the ability of each worker (for example, the number of years of experience registered in the worker management table 284).

Next, the farm work management apparatus 20 makes a determination whether the work content read out can be finished within the working hours (step S15). Since the estimated working time is calculated in step S14, the work end time can be calculated from the current time and the estimated working time, and the farm work management apparatus 20 can make a determination whether the work content read out can be finished within the working hours by comparing the calculated work end time and the time registered in the item of the working hours of the worker management table 284.

In a case where the work can be finished within the working hours (S15: YES), a subsequent work content is read out from the work management table 282 (step S16), and the processing is returned to step S14. In a case where the work cannot be finished within the working hours (S15: NO), the work content read out from the progress management table 283 or the work management table 282 and the information about the estimated working hour having been calculated are transmitted and notified to the communication terminal 10 via the communication apparatus 270 (step S17). The communication terminal 10 having received such information displays the information on the display unit 13.

Next, the farm work management apparatus 20 makes a determination whether the work carried out by the worker has been finished, based on the notification from the communication terminal 10 input via the communication interface 27 (step S18). In the same manner as the start of the work, when the farm work management apparatus 20 receives via the communication apparatus 270 the signal, which is transmitted when the operation button 12A of the communication terminal is depressed, and the RFID number of the corresponding communication terminal 10, the farm work management apparatus 20 refers to the RFID management table 285, and can determine whether the work carried out by the worker carrying the corresponding communication terminal 10 has been finished, by checking whether the work start flag corresponding to the received RFID number is "1" or "0". In a case where the farm work management apparatus 20 does not receive the signal, which is transmitted when the operation button 12A of the communication terminal 10 is depressed, namely, the work is determined not to have finished yet (S18: NO), the farm work management apparatus 20 waits until the work finishes.

In a case where the work start flag is "1" when the farm work management apparatus 20 receives the signal, which is transmitted when the operation button 12A of the communication terminal 10 is depressed, and the RFID number of the corresponding communication terminal 10, the operation button 12A is determined to be depressed during the work, and therefore, the work is determined to have finished (S18: YES), and the processings in this flowchart are terminated upon setting "0" to the work start flag.

Figure 11:
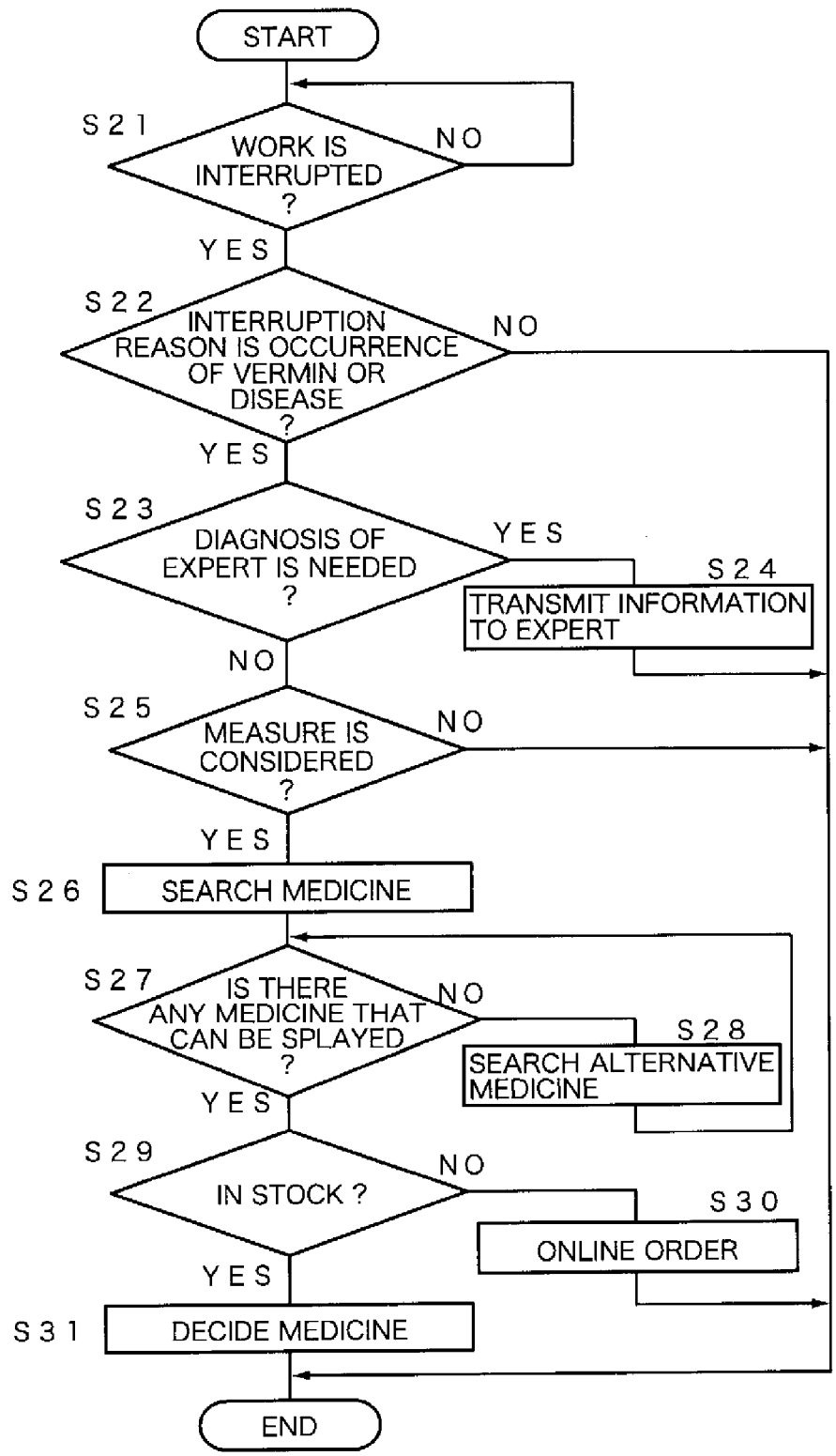
FIG. 11 is a flowchart showing a procedure of processings executed by the farm work management apparatus during the interruption of the work.

FIG. 11 is a flowchart showing a procedure of processings executed by the farm work management apparatus during the interruption of the work. First, the farm work management apparatus 20 makes a determination whether the work carried out by the worker is interrupted, based on the notification from the communication terminal 10 input via the communication interface 27 (step S21). In the same manner as above, the farm work management apparatus 20 refers to the RFID management table 285 to check whether the work interruption flag corresponding to the RFID number of the communication terminal 10 is "1" or "0", so that the farm work management apparatus 20 can determine whether the work carried out by the worker carrying the corresponding communication terminal 10 is interrupted. The farm work management apparatus 20 waits until the work is interrupted in a case where the farm work management apparatus 20 does not receive the signal, which is transmitted when the operation button 12C of the communication terminal 10 is depressed, namely, in a case where the work is determined not to be interrupted (S21: NO).

In a case where the work interruption flag is "0" when the farm work management apparatus 20 receives the signal, which is transmitted when the operation button 12C of the communication terminal 10 is depressed, and the RFID number of the corresponding communication terminal 10, the operation button 12C is determined to be depressed while the work is executed, and therefore, the work is determined to have been interrupted (S21: YES). At this moment, the farm work management apparatus 20 sets "1" to the work interruption flag.

Subsequently, the farm work management apparatus 20 makes a determination whether the interruption reason is the occurrence of the vermin or disease (step S22). For example, in a case where there is an access to an item of the interruption reason in the work history management table 286 while the work is interrupted or where there is an access to the pest management table 287, the interruption reason is determined to be the occurrence of the vermin or disease. In a case where the interruption reason is determined not to be the occurrence of the vermin or disease (S22: NO), the processings in this flowchart are terminated.

In a case where the interruption reason is determined to be the occurrence of the vermin or disease (S22: YES), a determination is made as to whether the diagnosis of the expert is needed (step S23). For example, in a case where the items other than the name of the pest are registered to the pest management table 287 or where only the discovery date, the location, and the name of the pest are input, leaving the other items blank, and are registered to the pest measure history table 288, the diagnosis of the expert is determined to be necessary. In a case where the determination of the expert is determined to be necessary (S23: YES), the information is transmitted to the expert (step S24). Specifically information about the crop, the breed variety, the growth stage, the discovery date, the discovery location, the name of the pest, the image, the weather conditions, and the like is transmitted to the terminal 30 used by the expert via the communication network N.

In a case where the diagnosis of the expert is determined not to be necessary (S23: NO), a determination is made as to whether the measure is to be considered (step S25). For example, the farm work management apparatus 20 receives a search request of the medicine via the keyboard 250 connected to the input interface 25, the farm work management apparatus 20 determines that the measure is to be considered (S25: YES), and searches the medicine registered to the medicine database 280 (step S26). FIG. 12 is a table showing an example of a search result of the medicines. In the example shown in FIG. 12, information about the discovery date, the location, the name of the pest, the search result medicine, the stock, the number of times of spraying, whether the medicine can be sprayed, and the order condition is output as the search result. In a case where the farm work management apparatus 20 determines that the measure is not to be considered (S25: NO), the processings in this flowchart are terminated.

As a result of the search of the medicine, a determination is made as to whether there is any medicine that can be sprayed (step S27). When the medicine matching the condition is not found or when the limitation on the number of times of spraying has already been reached even where the medicine matching the condition is found, the farm work management apparatus 20 determines that there is not any medicine that can be sprayed (S27: NO) and searches an alternative medicine (step S28), and the processing is returned to step S27.

In a case where there is a medicine that can be sprayed (S27: YES), a determination is made as to whether the medicine is in stock (step S29). In a case where the medicine is determined to be out of stock (S29: NO), an online order is placed by transmitting information about the name of the person who places the order, the name of the medicine to be ordered, the number of medicines needed, and the like to the terminal 40 of the order center via the communication network N (step S30). In a case where the medicine is determined to be in stock in step S29 (S29: YES), the medicine to be sprayed is decided (step S31), and the processings in this flowchart are terminated.

Figure 13:
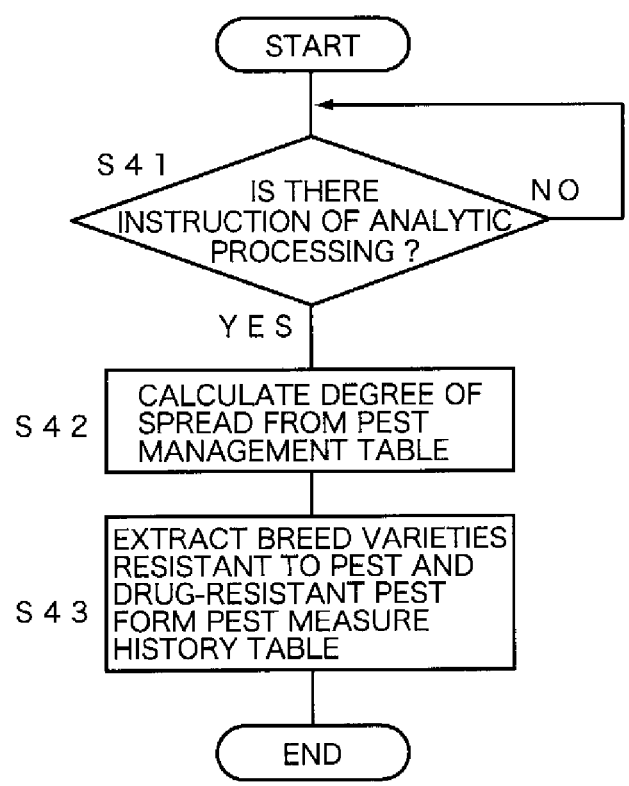
FIG. 13 is a flowchart showing a procedure of processings executed by the farm work management apparatus when an analytic processing is executed.

FIG. 13 is a flowchart showing a procedure of processings executed by the farm work management apparatus 20 when an analytic processing is executed. First, the farm work management apparatus 20 makes a determination whether there is an execution instruction of the analytic processing, based on the information input via the input interface 25 (step S41). In a case where the farm work management apparatus 20 determines that there is not any execution instruction of the analytic processing (S41: NO), the farm work management apparatus 20 waits until the execution instruction is given.

In a case where the farm work management apparatus 20 determines that there is an execution instruction of the analytic processing (S41: YES), the farm work management apparatus 20 calculates the degree of spread of the pests, based on the pest management table 287 (step S42). For example, the degree of spread of the pests can be calculated by obtaining a difference from previous observation data assuming that the width of the lane is 1 m. FIG. 14 is a table showing an example of a calculation result of the degree of spread of the pests. In the example shown in FIG. 14, information about the discovery date, the location, the name of the pest, the contaminated range, and the like is recorded as the observation history of the pests, and the degree of spread is calculated based on such record.

Subsequently, the farm work management apparatus 20 extracts the breed varieties resistant to the pests and the drug-resistant pests from the pest measures history table 288 (step S43). FIGS. 15A and 15B are a table showing an example of an extraction result of the breed varieties resistant to the pests and drug-resistant pests resistant to the pests. In the example shown in FIG. 15A, "TM01" and "TM03" are extracted as the breed varieties resistant to the pests. In the example shown in FIG. 15B, "aphid" is extracted as the drug-resistant pest.

In the present embodiment, the start of the work, the end of the work, and the interruption of the work are determined based on the flags managed in the RFID management table 285, but a rule may be previously defined regarding how the operation buttons 12A to 12C of the communication terminal 10 are depressed, and a determination may be made based on a signal, which is transmitted when the operation buttons 12A to 12C are depressed in accordance with the way of depressing according to the rule. For example, if the operation button 12A is depressed once, the farm work management apparatus 20 may determine that the work has been started, and if the operation button 12A is depressed twice, the farm work management apparatus 20 may determine that the work has been finished. In a case where the operation button 12B is depressed and held, the farm work management apparatus 20 may determine that the work is interrupted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification related to a showing of the superiority and inferiority of the invention. Although the embodiments of the present inventions have been described in detail, it should be understood that the various changes, substitutions, and alternations could be made hereto without departing from the spirit and scope of the invention.

What is claimed is:

1. A farm work management system comprising:
a communication apparatus for transmitting location information of a worker carrying out a farm work; and
a farm work management apparatus for managing a progress of the farm work based on the location information transmitted from the communication apparatus; wherein
the communication apparatus comprises:
an operation unit including a first button notifying a start or an end of the farm work, a second button notifying a transition to a next farm work and a third button notifying the interruption of the farm work,
a notifying unit for notifying the farm work management apparatus that the farm work is started or the farm work is finished in a case when the operation unit receives the operation by the first button, notifying the farm work management apparatus that the farm work is transited to the next farm work in a case when the operation unit receives the operation by the second button, and notifying the farm work management apparatus that the farm work is interrupted in a case when the operation unit receives the operation by the third button,
a receiving unit for receiving information transmitted from the farm work management apparatus, and
a display unit for displaying the received information; and
the farm work management apparatus comprises:
a progress management table for storing a work location, a work content to be carried out at the work location, and a progress of the work as being associated with each other,
a receiving unit for receiving a notification from the communication unit;
an accepting unit for accepting information about interruption reason in case the receiving unit receives the notification that the farm work is interrupted;
a work history generating unit for generating a work history including the information about the interruption reason based on the notification from the communication apparatus and the information accepted at the accepting unit,
a work location identifying unit for identifying the work location based on the location information transmitted from the communication apparatus,
a reading unit for reading out information about the progress and the work content to be carried out at the identified work location from the progress management table,
a calculating unit for calculating an estimated work time from the read information about the progress, and
a transmitting unit for transmitting to the communication apparatus the information about the read work content and the estimated work time having been calculated.

2. The farm work management system according to claim 1, wherein the farm work management apparatus includes means for updating the information about the progress and the work content stored in the progress management table, in accordance with the generated work history.

3. The farm work management system according to claim 1, wherein the farm work management apparatus includes the progress management table for each plant or each breed variety of the plant.

4. The farm work management system according to claim 1, wherein the interruption reason includes spraying of a medicine due to an occurrence of vermin or disease, and
the interruption history generating unit of the farm work management apparatus generates the interruption history by storing information about the occurred vermin or disease and information about an occurrence location in association with the time.

5. The farm work management system according to claim 4, wherein the farm work management apparatus calculates degree of spread of the vermin or disease at the occurrence location, based on the information stored in the interruption history.

6. The farm work management system according to claim 4, wherein the farm work management apparatus transmits the information about the occurrence location and the information about the occurred vermin or disease to the outside.

7. The farm work management system according to claim 1, wherein the interruption reason includes spraying of a medicine due to an occurrence of vermin or disease, and
the interruption history generating unit of the farm work management apparatus generates the interruption history by storing information about the sprayed medicine and information about a sprayed location in association with the time.

8. The farm work management system according to claim 4, wherein the farm work management apparatus includes determination unit for determining whether or not a diagnosis of an expert is needed, and
when it is determined that the diagnosis of the expert is needed, the farm work management apparatus transmits information about the occurred vermin or disease and location information to a communication device possessed by the expert.

9. The farm work management system according to claim 7, wherein the farm work management apparatus includes determination unit for determining whether or not a diagnosis of an expert is needed, and
when it is determined that the diagnosis of the expert is needed, the farm work management apparatus transmits information about the occurred vermin or disease and location information to a communication device possessed by the expert.

10. The farm work management system according to claim 7, wherein the farm work management apparatus includes a pest measure history table storing plants resistant to vermin or disease and drug-resistant vermin or diseases, wherein
the farm work management apparatus extracts a plant resistant to vermin or disease and drug-resistant vermin or disease.

11. The farm work management system according to claim 7, wherein the farm work management apparatus transmits the information about the occurrence location and the information about the occurred vermin or disease to the outside.

12. The farm work management system according to claim 1, wherein the farm work management apparatus includes a medicine database for storing a type of the medicine, a use of the medicine, and a limitation on the number of times of spraying defined with respect to the medicine as being associated with each other,
a search unit for searching from the medicine database the medicine that can be sprayed when a notification to the effect that the farm work is interrupted is received, and
a display unit for displaying information about the searched medicine that can be sprayed.

13. The farm work management system of claim 1, wherein the estimated work time is calculated from a table that stores information relating to standard work time per unit area of a worker, the number of workers currently carrying out the work, and the size of the cultivated area, calculating the estimated work time being based on a size of a cultivated area and the number of the workers.

14. A farm work management system comprising:
a communication apparatus for transmitting location information of a worker carrying out a farm work; and
a farm work management apparatus for managing a progress of the farm work based on the location information transmitted from the communication apparatus; wherein
the communication apparatus comprises:
an operation unit including a first button notifying a start or an end of the farm work, a second button notifying a transition to a next farm work and a third button notifying the interruption of the farm work,
a communication unit for notifying the farm work management apparatus that the farm work is started or the farm work is finished in a case when the operation unit receives the operation by the first button, notifying the farm work management apparatus that the farm work is transited to the next farm work in a case when the operation unit receives the operation by the second button, and notifying the farm work management apparatus that the farm work is interrupted in a case when the operation unit receives the operation by the third button, and receiving information transmitted from the farm work management apparatus, and
a display unit for displaying the received information;
and the farm work management apparatus comprises:
a progress management table for storing a work location, a work content to be carried out at the work location, and a progress of the work as being associated with each other,
a receiving unit for receiving a notification from the communication unit;
an accepting unit for accepting information about interruption reason in case the receiving unit receives the notification that the farm work is interrupted;
a controller capable of performing operations of:
generating a work history including the information according to the interruption reason based on the notification from the communication apparatus and the information accepted at the accepting unit,
identifying the work location based on the location information transmitted from the communication apparatus,
reading out information about the progress and the work content to be carried out at the identified work location from the progress management table,
calculating an estimated work time from the read information about the progress, and
transmitting to the communication apparatus the information about the read work content and the estimated work time having been calculated.

15. The farm work management system of claim 14, wherein the estimated work time is calculated from a table that stores information relating to standard work time per unit area of a worker, the number of workers currently carrying out the work, and a size of a cultivated area, calculating the estimated work time being based on the size of the cultivated area and the number of the workers.

16. A farm work management method for obtaining location information of a worker carrying out a farm work and managing a progress of the farm work based on the obtained location information, the farm work management method comprising:
storing a work location, a work content to be carried out at the work location, and a progress of the work and then storing the same in a progress management table as being associated with each other;
receiving notification about a start or an end of the farm work, a transition to a next farm work and an interruption of the farm work;
accepting information about interruption reason in case the receiving unit receives the notification that the farm work is interrupted;

generating a work history including the information about the interruption reason based on the received notification and the accepted information;

identifying the work location based on the location information when the location information is obtained;

reading out information about the progress and the work content to be carried out at the identified work location from the progress management table; calculating an estimated work time from the read information about the progress; and transmitting to one or more other devices the information about the read work content and the estimated work time having been calculated, wherein the farm work management method is executed by a communication apparatus equipped with a first button notifying the start of the end of the farm work, a second button notifying the transition to the next farm work and a third button notifying the interruption of the farm work.

17. The farm work management method of claim 16, wherein the estimated work time is calculated from a table that stores information relating to standard work time per unit area of a worker, the number of workers currently carrying out the work, and a size of a cultivated area, calculating the estimated work time being based on the size of the cultivated area and the number of the workers.

\* \* \* \* \*